United States Patent
Schock et al.

(10) Patent No.: US 9,419,552 B2
(45) Date of Patent: Aug. 16, 2016

(54) MOTOR INTERFACE CONTROLLER HAVING AN INTEGRATED POWER SUPPLY

(71) Applicant: Nidec Motor Corporation, St. Louis, MO (US)

(72) Inventors: Christopher D. Schock, St. Louis, MO (US); Randy L. Bomkamp, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 15 days.

(21) Appl. No.: 14/302,064

(22) Filed: Jun. 11, 2014

(65) Prior Publication Data

US 2015/0365023 A1    Dec. 17, 2015

(51) Int. Cl.
  *H02P 27/00*    (2006.01)
  *H02P 6/00*    (2016.01)
  *B60L 9/00*    (2006.01)
  *H02P 6/08*    (2016.01)

(52) U.S. Cl.
  CPC ..................................... *H02P 6/085* (2013.01)

(58) Field of Classification Search
  USPC ............. 180/6.44; 701/22; 318/400.3, 400.16
  See application file for complete search history.

(56) References Cited

U.S. PATENT DOCUMENTS

| | | | |
|---|---|---|---|
| 7,808,193 B1* | 10/2010 | Krishnamoorthy .... | G11B 19/28 318/400.16 |
| 8,446,111 B2* | 5/2013 | Sonoda ................ | B62D 5/0406 180/6.44 |
| 2005/0113988 A1* | 5/2005 | Nasr ...................... | A62C 27/00 701/22 |
| 2010/0165674 A1* | 7/2010 | Dai ................... | H02M 7/53873 363/37 |
| 2011/0182094 A1* | 7/2011 | Lumsden ................. | H02J 1/14 363/126 |
| 2011/0263309 A1* | 10/2011 | Gowin ................ | G07F 17/3204 463/16 |
| 2011/0273118 A1* | 11/2011 | Bonner .............. | H02M 1/4225 318/400.3 |
| 2013/0095685 A1* | 4/2013 | Rassoolkhani ...... | H01R 13/639 439/345 |

* cited by examiner

*Primary Examiner* — Eduardo Colon Santana
*Assistant Examiner* — Cortez Cook
(74) *Attorney, Agent, or Firm* — Hovey Williams LLP

(57) ABSTRACT

A motor assembly broadly includes a motor, a motor controller, and an interface controller having an integrated power supply. The integrated power supply includes an AC to DC power conversion and voltage reduction component. The motor controller and the interface controller receive line voltage electrical power without the need for an external transformer.

19 Claims, 5 Drawing Sheets

MOTOR INTERFACE CONTROLLER HAVING AN INTEGRATED POWER SUPPLY

The present invention relates to interface controllers for use with electric motors.

Electric motors often include motor controllers for instructing the motors how to operate and interface controllers for communicating with the motor controllers. Each motor controller and interface controller receives electrical power from an external power source such as an AC 120V mains power line that must be converted to DC power and/or undergo a voltage reduction before the power can be delivered to the electrical circuits of the controllers. The interface controller does not have its own way to receive reduced voltage power and requires an external or auxiliary transformer to be connected thereto. This increases production costs for wiring and packaging and creates compatibility issues between interface controller models and auxiliary transformers.

SUMMARY

The present invention solves the above-described problems by providing a motor assembly including a motor, a motor controller, and an interface controller having an integrated power supply. The motor includes a stator, a rotor, a motor case enclosing the stator and the rotor, an output shaft, and a power input terminal. The rotor is located generally within the stator and is rotatable relative to the stator about an axis. The motor case is fixed relative to the stator and is spaced radially about the rotor axis. The output shaft extends from an opening in the motor case and is rotatable with the rotor. The power input terminal receives electric current from the motor controller for powering the motor.

The motor controller is connected to the motor and includes an AC to DC power conversion component, a DC voltage reduction component, a digital signal processor, an isolated interface circuit, a DC to AC power inverter, an input terminal, and an output terminal. The motor controller power input terminal connects to an external power conduit for receiving AC power from an external power source. The AC to DC power conversion component converts the AC power to DC power for use by the digital signal processor. The DC voltage reduction component reduces and regulates the voltage level of the DC power transmitted to the digital signal processor. The digital signal processor receives input signals from the interface controller and converts them into signals for controlling the motor. The isolated interface circuit provides fault protection to the digital signal processor. The DC to AC power inverter converts the high voltage DC power to three phase current for powering the motor. The input terminal connects to the interface controller for receiving control signals therefrom. The output terminal connects to the power input terminal of the motor for transmitting the three phase current to the motor.

The interface controller is connectable to the motor controller and includes an integrated AC to DC power conversion and voltage reduction component, a user interface, and a micro-controller. The integrated AC to DC power conversion and voltage reduction component (i.e., integrated power supply) converts high voltage AC power received from the external power source to low voltage DC power for use by the micro-controller. The user interface receives user input commands for changing or setting the motor speed, torque, and other motor operating parameters and settings. The micro-controller is connected to the user interface and instructs the motor controller to operate according to the user input commands.

The integrated power supply of the interface controller eliminates the need for an external or auxiliary power transformer and allows the motor controller and the interface controller to be connected directly to an AC mains line either individually or together. This simplifies wiring and installation and provides a more compact, more versatile, and more marketable motor assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
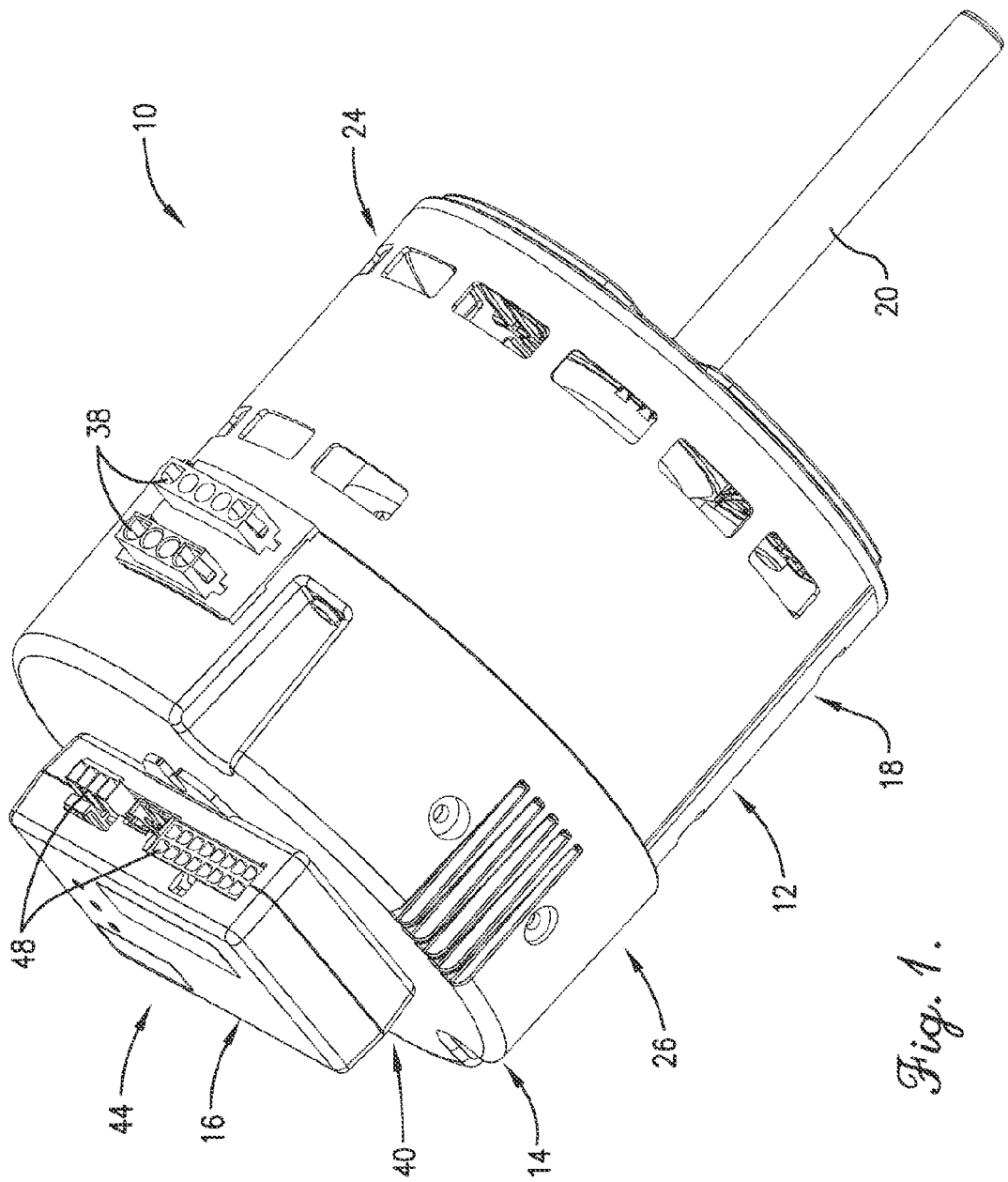
FIG. 1 is a perspective view of a motor assembly constructed in accordance with an embodiment of the present invention.
Figure 2:
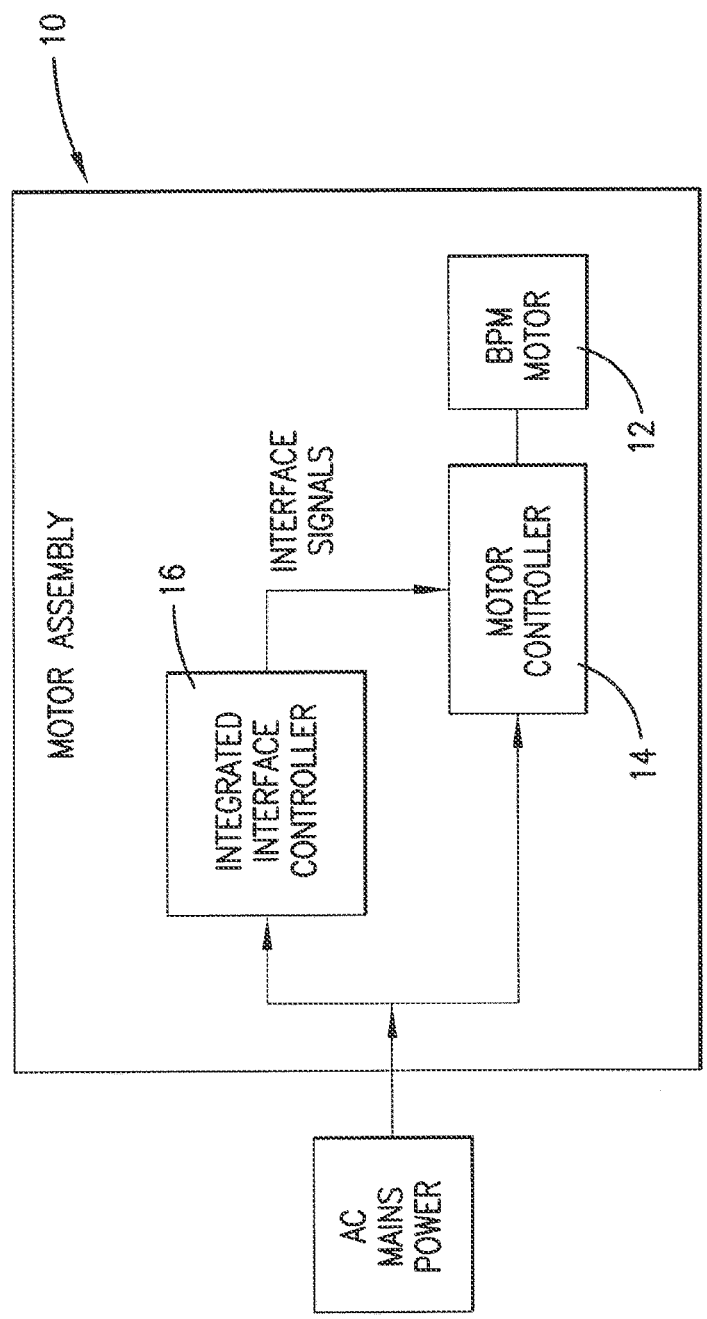
FIG. 2 is a schematic view of the motor assembly of FIG. 1.
Figure 3:
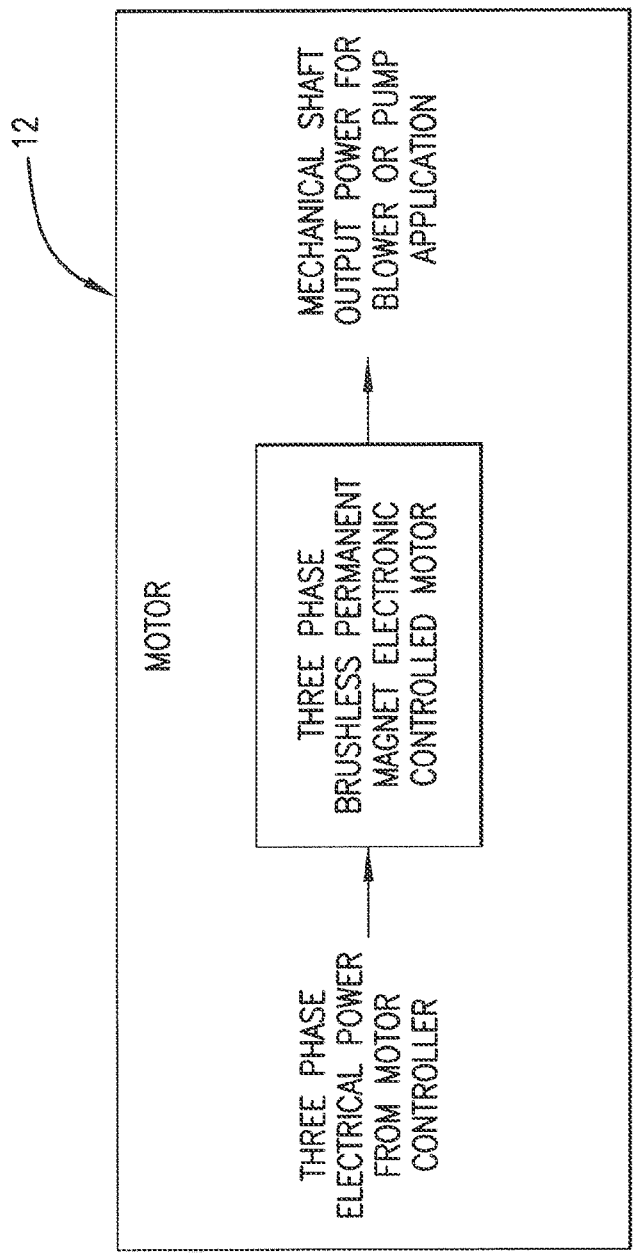
FIG. 3 is a schematic view of the motor of the motor assembly of FIG. 1.
Figure 4:
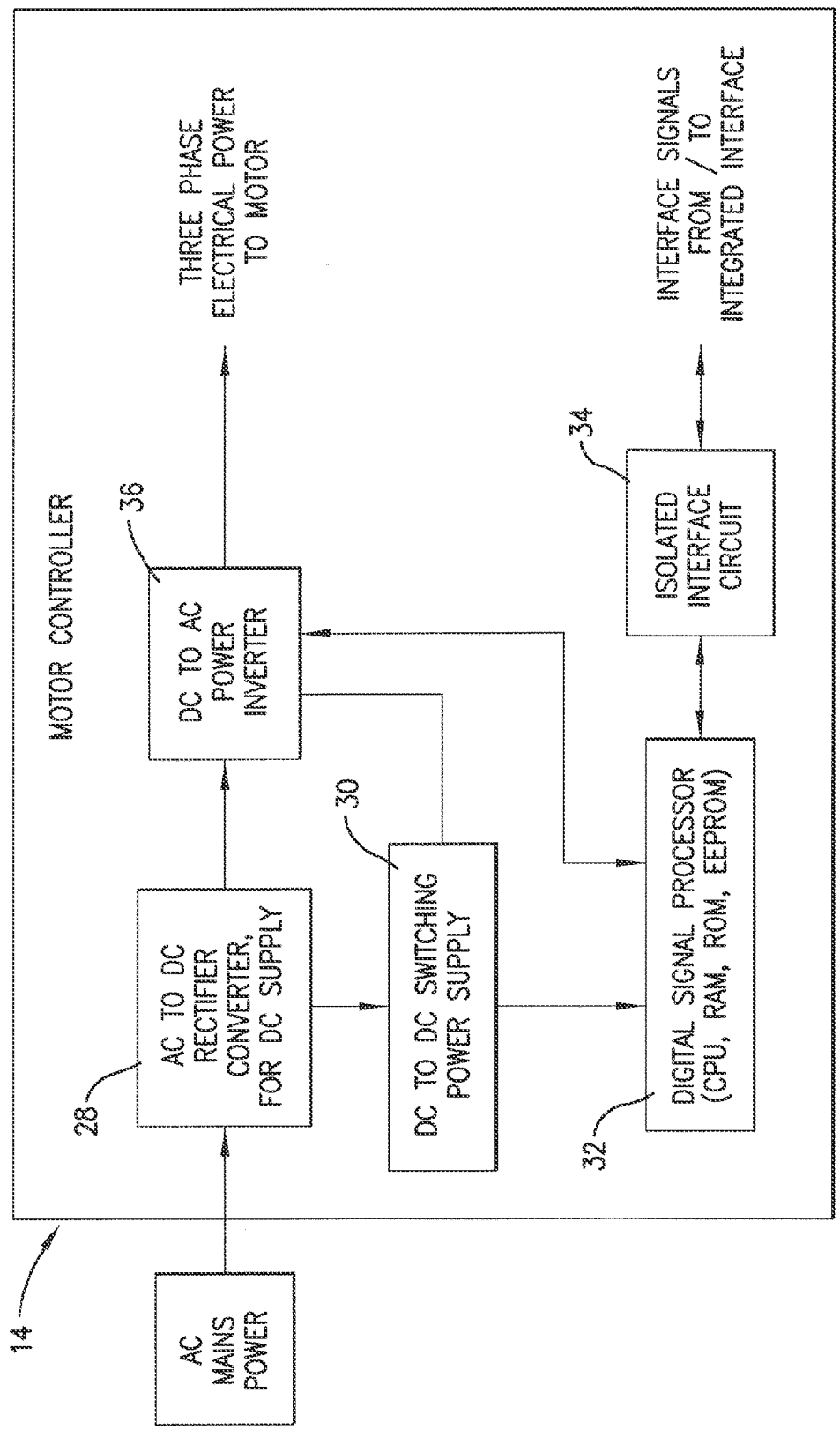
FIG. 4 is a schematic view of the motor controller of the motor assembly of FIG. 1.
Figure 5:
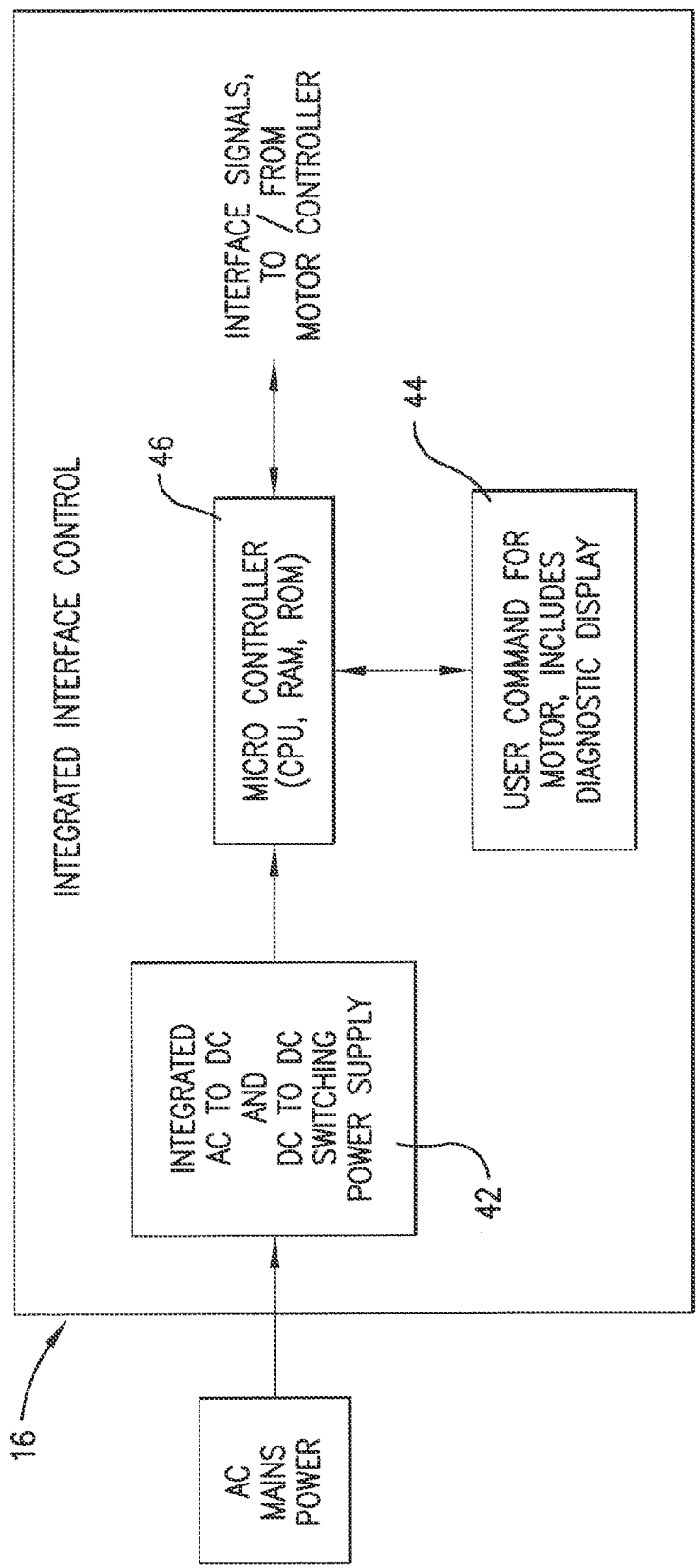
FIG. 5 is a schematic view of the interface controller of the motor assembly of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and particularly FIG. 1, a motor assembly 10 constructed in accordance with an embodiment of the invention is illustrated. The motor assembly 10 broadly comprises a motor 12, a motor controller 14, and an interface controller 16.

The motor 12 converts electrical power to mechanical power and may be designed for heating, ventilation, and air conditioning (HVAC) systems, pumping systems, washing machines, dishwashers, or any other electrically powered devices or systems. The motor 12 may be synchronous or asynchronous, permanent split capacitor (PSC) motor, brushed DC motor, brushless permanent magnet motor, switched reluctance motor, coreless or ironless DC motor, induction motor, torque motor, stepper motor, or any other type of motor. The motor 12 may be fixed speed, multi-speed, or variable speed and may have any horsepower (HP) rating. The motor 12 includes a motor case 18, a stator, a rotor, an output shaft 20, and a power input terminal.

The motor case 18 encloses the stator and rotor therein and includes an axial output shaft opening and a number of radial ventilation openings 24. The motor case 18 may include mounting bosses, brackets, or surfaces for mounting the motor 12 horizontally or vertically.

The stator creates electromagnetic fields around the rotor to rotate the rotor and is fixed within the motor case 18. The stator includes copper or other conductive wire windings organized around a rotor axis.

The rotor rotates due to the induced electromagnetic fields created by the stator and is rotatable relative to the stator about the rotor axis.

The output shaft 20 rotates with the rotor to provide mechanical power to a blower or other device. The output shaft 20 extends from the axial output shaft opening and rotates with the rotor about the rotor axis.

The input terminal is connectable to the output terminal of the motor controller 14 for receiving AC power therefrom.

The motor controller 14 instructs the motor 12 how to operate and includes a shell 26, an AC to DC power conversion component 28, a DC voltage reduction component 30, a digital signal processor 32, an isolated interface circuit 34, a DC to AC power inverter 36, an input terminal, an output terminal, and a number of connection points 38.

The shell 26 encloses the electrical components 28, 30, 32, 34, and 36 and attaches to the motor case 18. The shell 26 may include a number of ventilation openings 40 for allowing cool air to circulate into the shell 26.

The AC to DC power conversion component 28 converts the AC power received from the external power source to DC power. The AC to DC power conversion component may be a rectifier converter or similar type of converter and may include one or more filters, capacitors, resistors, inductors, and/or other electrical elements to smooth out the DC power.

The DC voltage reduction component 30 lowers the voltage of the DC power to a level suitable for use by the digital signal processor 32 and may be a linear regulator or a power switching component (i.e. a switched-mode power supply), The DC voltage reduction component 30 may include one or more filters, capacitors, resistors, inductors, and/or other electrical elements to reduce and regulate the DC voltage level. The AC to DC power conversion component 28 and the DC voltage reduction component 30 may be combined in some embodiments.

The digital signal processor 32 receives input signals from the interface controller 16 and converts them into signals for controlling the motor 12. The digital signal processor 32 may include a CPU, RAM, ROM, EEPROM, processors, controllers, integrated circuits, programmable logic devices, or other data and signal processing devices for storing motor operating parameters, commands, and instructions for retrieval by the interface controller 16. The digital signal processor 32 may include software or other executable computer code that can be embodied on any of the non-transitory computer-readable medium above for implementing logical functions therein.

The isolated interface circuit 34 is connected between the digital signal processor 32 and the interface controller 16 and electrically isolates the digital signal processor 32 from the interface controller 16 so as to provide fault protection to the digital signal processor 32.

The DC to AC power inverter 36 converts the DC power received from the AC to DC power conversion component 28 into AC power for use by the motor 12. The DC to AC power inverter 36 may include one or more filters, capacitors, resistors, inductors, and/or other electrical elements to convert the DC power to AC power. The output AC power may be single phase, two phase, or three phase depending on the motor 12.

The input terminal is connectable to an external power conduit for receiving power from an external power source (e.g., 277 volt or 115 volt AC mains line).

The output terminal connects the motor controller 14 to the motor 12 for delivering the AC power and control signals to the motor 12.

The electrical connection points 38 allow the motor controller 14 to be connected to diagnostic tools or other devices and may include 4-wire, 16-pin, or other communication connectors.

The interface controller 16 receives external (e.g., user) inputs and manipulates the motor controller 14 to instruct the motor 12 to operate according to the inputs. The interface controller 16 includes an integrated AC to DC power conversion and voltage reduction component 42, a user interface 44, a micro-controller 46, an input terminal, an output terminal, and a number of connection points 48.

The integrated AC to DC power conversion and voltage reduction component 42 (i.e., integrated power supply) converts AC power received from the external power source to DC power and reduces the DC voltage to a level suitable for use by the user interface 44 and micro-controller 46. The integrated AC to DC power conversion and voltage reduction component 42 may be a rectifier converter or similar type of converter, a linear regulator, a transformer, and/or a power switching component, and may include one or more filters, capacitors, resistors, inductors, and/or other electrical elements to smooth out the DC power. The integrated AC to DC power conversion and voltage reduction component 42 also isolates the user interface 44 and the micro-controller 46 from the high voltage of the external power source via optical isolation or other isolation element.

The user interface 44 receives user input commands for changing or setting the motor speed, voltage, current, power, resistance, torque, or other motor operating parameters and settings. The user interface 44 may include an LCD, touchscreen, or other display and a number of buttons, switches, or other controls for providing the user input commands to the interface controller 16.

The micro-controller 46 receives the user inputs from the user interface 44 and retrieves motor operating parameters and other information from the memory of the digital signal processor 32 of the motor controller 14 for instructing the motor controller 14 to operate the motor 12 according to the user inputs. The micro-controller 46 may include a CPU, RAM, ROM, EEPROM, or any other processors, controllers, integrated circuits, programmable logic devices, or other data and signal processing devices for manipulating and storing the user inputs.

The input terminal of the interface controller 16 is connectable to an external power conduit for receiving power from the external power source (e.g., 277 volt or 115 volt AC mains line). It will be understood that the input terminal may be wired instead to a terminal of the motor controller 14 for receiving AC power therethrough.

The output terminal of the interface controller 16 connects the interface controller 16 to the motor controller 14 for delivering control signals thereto.

The connection points 48 allow the interface controller 16 to be connected to diagnostic tools or other devices and may include 4-wire, 16-pin, or other communication connectors.

The above-described motor assembly 10 provides many advantages over conventional motor assemblies. For example, the integrated AC to DC power conversion and voltage reduction component 42 (i.e., the integrated power supply) of the interface controller 16 eliminates the need of an external or auxiliary transformer or any other external power supply. The interface controller 16 plugs directly into the mains circuit of the motor 12 to accommodate any line voltage (e.g., 120V, 240V, 115V or 277V, and 50 Hz or 60 Hz) and is compatible with a number of motor models. This simplifies wiring and installation and provides a more compact, more versatile, and more marketable motor assembly. The integrated AC to DC power conversion and voltage reduction component 42 eliminates the need to design separate auxiliary transformers and connection points for different interface controller models. The integrated power supply also does not need to be packaged separately, which eliminates the need for matching power supply and interface controller models and reduces production costs and inventory.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A motor assembly comprising:
    a motor comprising:
        a stator;
        a rotor;
        a motor case enclosing the stator and the rotor; and
        an output shaft connected to the rotor and extending from an opening in the motor case;
    a motor controller connected to the motor for controlling operation of the motor, the motor controller comprising:
        a digital signal processor; and
        an isolated interface circuit connected to the digital signal processor for providing fault protection to the digital signal processor; and
    an interface controller for communicating with the motor controller, the interface controller comprising:
        a housing;
        a user interface for receiving user input commands;
        a micro-controller positioned within the housing, the micro-controller being connected to the user interface for receiving the user input commands therefrom and being connected to the motor controller for instructing the motor controller how to control operation of the motor; and
        an integrated AC to DC power conversion and power voltage reduction component positioned within the housing and connected to the micro-controller for converting AC power received from an external power source to DC power and for reducing the power voltage received by the micro-controller,
    the digital signal processor being configured to convert commands from the interface controller into motor controlling signals for controlling operation of the motor.

2. The motor assembly of claim 1, wherein the power conversion and power voltage reduction component comprises a power switching component.

3. The motor assembly of claim 1, wherein the motor controller further comprises:
    an AC to DC power conversion component for converting AC power received from an external power source to DC power;
    a DC power reduction component for reducing the voltage of the DC power received from the AC to DC power conversion component; and
    a DC to AC power inverter for converting the DC power to AC power.

4. The motor assembly of claim 3, wherein the DC to AC power inverter converts the DC power to three phase AC power.

5. The motor assembly of claim 1, wherein the interface controller further comprises a power input terminal configured to be wired to the motor controller for receiving high voltage power from the external power source via the motor controller.

6. The motor assembly of claim 1, wherein the interface controller and the motor controller are each configured to separately receive high voltage power from the external power source.

7. The motor assembly of claim 1, wherein the power voltage reduction component of the interface controller electrically isolates the micro-controller of the interface controller from high voltage power.

8. The motor assembly of claim 1, wherein the housing of the interface controller is removably attachable to an outer surface of a case of the motor controller.

9. The motor assembly of claim 1, wherein the interface controller is compatible with a number of different motor models.

10. The motor assembly of claim 1, wherein the interface controller is housed substantially within a case of the motor controller.

11. The motor assembly of claim 1, wherein the motor is a variable speed AC induction or permanent magnet motor and the interface controller is configured to allow a user to select a motor speed, motor torque, or other motor operating command via the user interface of the interface controller.

12. A motor assembly comprising:
    a motor comprising:
        a stator;
        a rotor;
        a motor case enclosing the stator and the rotor; and
        an output shaft extending from an opening in the motor case;
    a motor controller connected to the motor for controlling operation of the motor, the motor controller comprising:
        a digital signal processor including a CPU and a memory;
        an isolated interface circuit connected to the digital signal processor for providing fault protection to the digital signal processor;

a motor controller power input terminal for receiving high voltage AC electrical power from an external power source;

an AC to DC power conversion component for converting the AC power to DC power for powering the digital signal processor and for powering the motor;

a DC power switching component for reducing the voltage of a portion of the DC power for providing reduced voltage DC power to the digital signal processor;

a DC to AC power inverter for converting the DC power to three phase AC power; and a motor controller power output terminal connectable to the motor for providing electrical power to the motor; and an interface controller for communicating with the motor controller, the interface controller comprising:

a housing;

a user interface for receiving user input commands;

a micro-controller positioned within the housing, the micro-controller being connected to the user interface for receiving the user input commands therefrom and being connected to the motor controller for instructing the motor controller how to control operation of the motor; and an integrated AC to DC power conversion and power switching component positioned within the housing and connected to the micro-controller for converting AC power received from an external power source to DC power and for reducing the power voltage received by the micro-controller, the interface controller being compatible with a number of motor models.

13. The motor assembly of claim 1, wherein the motor controller further comprises a plurality of electrical connection points for connecting to external devices.

14. The motor assembly of claim 13, wherein the electrical connection points are 4-wire connection points.

15. The motor assembly of claim 13, wherein the electrical connection points are 16-pin connection points.

16. The motor assembly of claim 1, wherein the user interface includes a touchscreen for receiving user input commands.

17. The motor assembly of claim 1, wherein the motor controller includes a shell configured to enclose the digital signal processor and the isolated interface circuit.

18. The motor assembly of claim 17, wherein the shell includes a plurality of ventilation openings for allowing cool air to circulate into the shell.

19. The motor assembly of claim 1, wherein the interface controller further comprises an input terminal wired to a terminal of the motor controller for receiving AC power therethrough.

* * * * *